No. 759,864. PATENTED MAY 17, 1904.
H. F. COHN, Jr.
SIFTER.
APPLICATION FILED NOV. 14, 1903.
NO MODEL.

WITNESSES:
Geo H Brooks
F. H. Kappa

INVENTOR
Henry F. Cohn Jr.
BY
Abraham Knobel
ATTORNEY

No. 759,864.

Patented May 17, 1904.

UNITED STATES PATENT OFFICE.

HENRY FREDERICH COHN, JR., OF LOUISVILLE, KENTUCKY.

SIFTER.

SPECIFICATION forming part of Letters Patent No. 759,864, dated May 17, 1904.

Application filed November 14, 1903. Serial No. 181,212. (No model.)

*To all whom it may concern:*

Be it known that I, HENRY FREDERICH COHN, Jr., a citizen of the United States, and a resident of Louisville, in the county of Jefferson and State of Kentucky, have invented a new and useful Improvement in Sifters, of which the following is a specification.

The objects of my improvement are simplicity of construction, economy of manufacture, to provide a sifter that may be operated with one hand while the other hand may be used to stir the batter, and one the sifting mechanism of which may easily be removed for cleaning. These objects I attain by means of the mechanism illustrated in the accompanying drawings, in which—

Figure 1:
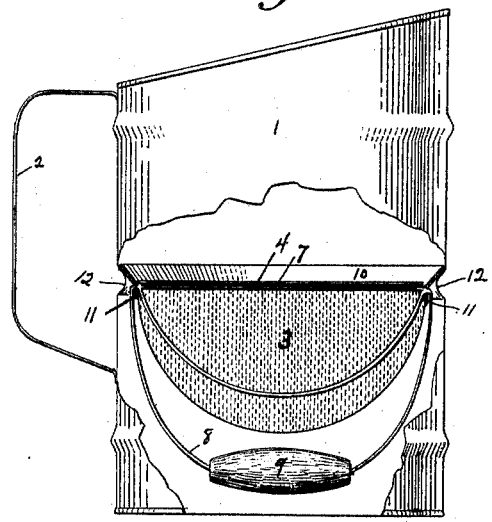
Figure 2:
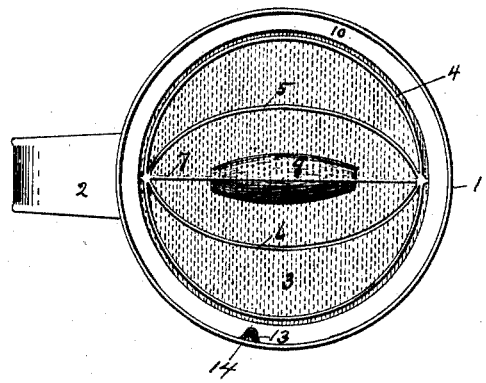

Figure 1 is a side elevation partly in section and having a portion of the external wall cut away to show the working parts, and Fig. 2 is a plan view.

The body 1 is a cup open both at the top and bottom, provided with a handle 2 on the side. At approximately the middle of its height an internal annular bead is formed in the wall, as shown at 12. On this bead rests the rim 10, which carries the wire-cloth sieve 3 and the rubbing mechanism. The rim 10 preferably has its sides sloping inward, forming a narrow hopper or funnel edge to prevent the flour from lodging thereon, as would be the case if the rim were horizontal. To rim 10 the wire sieve 3 is secured by soldering or other convenient means. At diametrically opposite points on rim 10 integral ears 11 extend vertically downward and are pierced to form bearings for the wire 7 8. The wire 7 passes diametrally across the top of the sieve, passes through ears 11, turns sharply downward at right angles between sieve 3 and the wall of cup 1, and forms the semicircular curve 8 under sieve 3. At the middle of curve 8 immediately under the sieve is secured a weight 9, of lead or other heavy metal. The sieve 3 is hemispherical and has on the inside a rubber of wire for the purpose of rubbing the flour through. This rubber consists of a circular wire 4, rigidly secured in a horizontal plane at diametrical points to wire 7, and semicircular wires 5 and 6, similarly secured at their ends, placed on the inside of the sieve and adapted to oscillate and rub over the inner surface of the sieve. A notch 13 is formed in the outer edge of rim 10, adapted to fit over a corresponding lug 14, formed in the wall of cup 1, and serves to keep the sifting mechanism in proper operative alinement.

It will be understood that the entire sifting mechanism may readily be lifted out of the upper end of cup 1.

To operate my new sifter, it is grasped with one hand by handle 2, dipped into the flour to fill the upper part of the cup 1, and shaken gently from side to side. The inertia of weight 9 causes the rubber-wires 4 5 6 to oscillate and rub the flour through sieve 3.

Having thus described my invention so that any one skilled in the art pertaining thereto may make and use it, what I claim as new, and desire to secure by Letters Patent, is—

1. In a sifter, in combination with a cup and a handle thereto, a screen or sieve forming a false bottom in said cup, wire rubbers oscillatively mounted over said screen or sieve, and a weight oscillatively mounted under said screen or sieve and operatively connected with said wire rubbers, substantially as and for the purpose specified.

2. In a sifter, the combination of a container, a rim disposed above the lower edge of said container, a hemispherical sieve secured to said rim, semicircular wire rubbers oscillatively mounted over the inner surface of said sieve, a diametral shaft oscillatively pivoted at diametrical points in said rim, a semicircular extension of said diametral shaft, and an oscillating weight secured on said semicircular extension under said sieve, substantially as specified.

3. In a sifter, the combination of a container and a handle thereto, a screen or sieve forming a false bottom in said container, a rubber oscillatively mounted over said screen or sieve, and a weight disposed outside of said screen or sieve where it does not come into contact with the flour before it is sifted, operatively connected with said rubber, and imparting motion to said rubber by inertia, substantially as specified.

HENRY FREDERICH COHN, JR.

Witnesses:
GEO. H. BROOKS,
F. H. KAPPA.